United States Patent Office 3,441,053
Patented Apr. 29, 1969

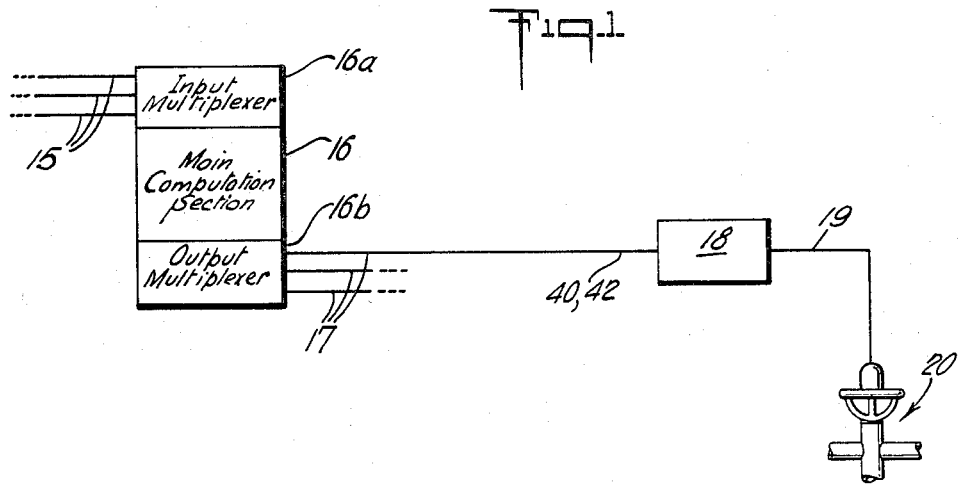
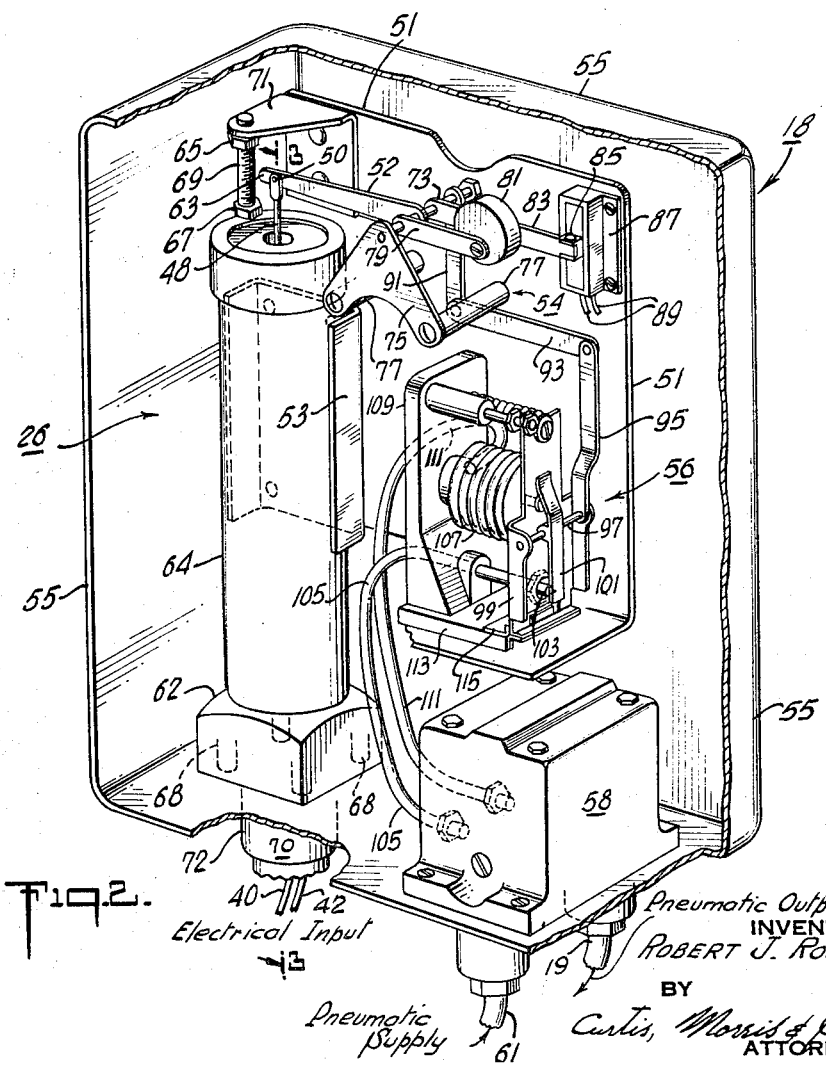

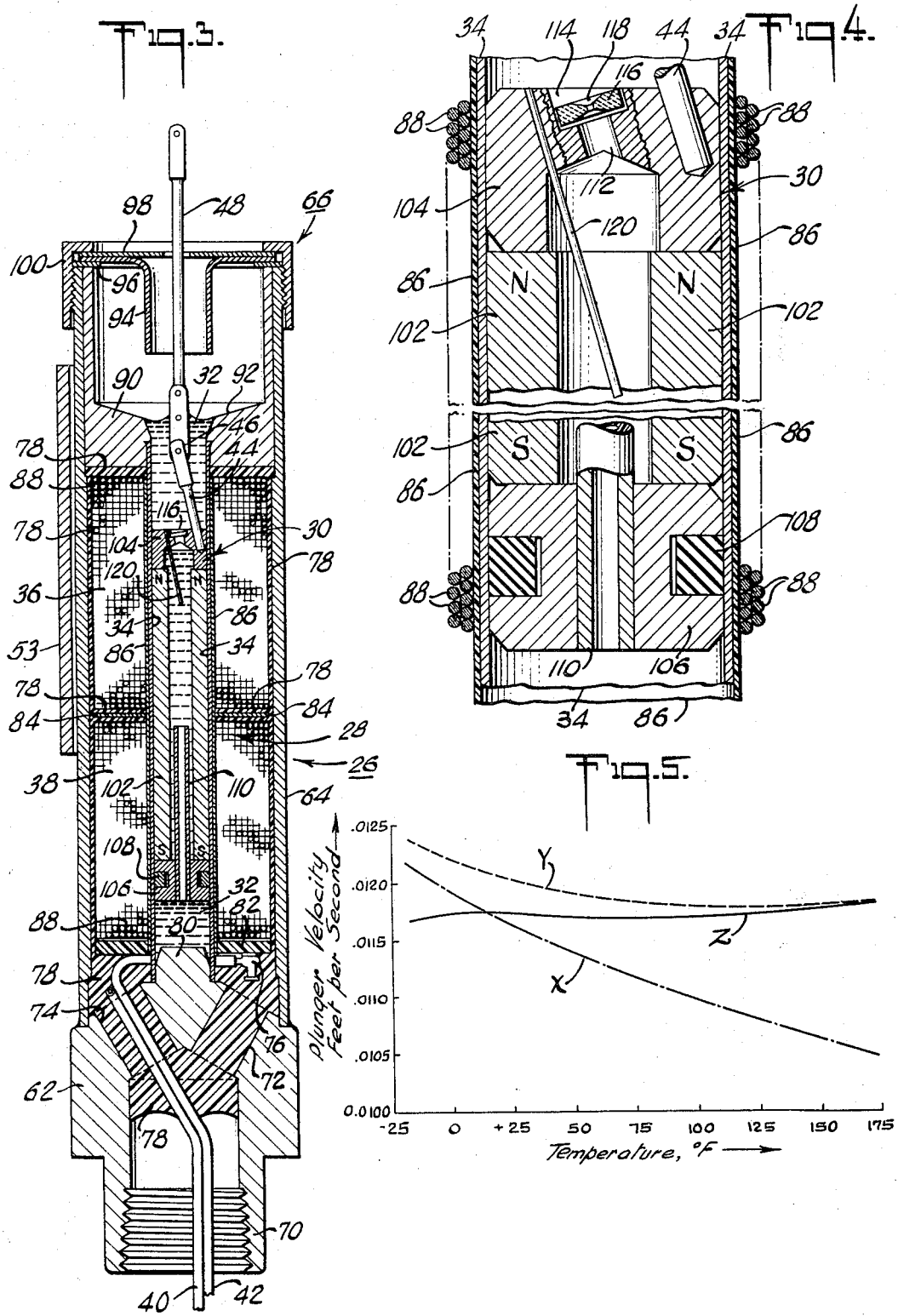

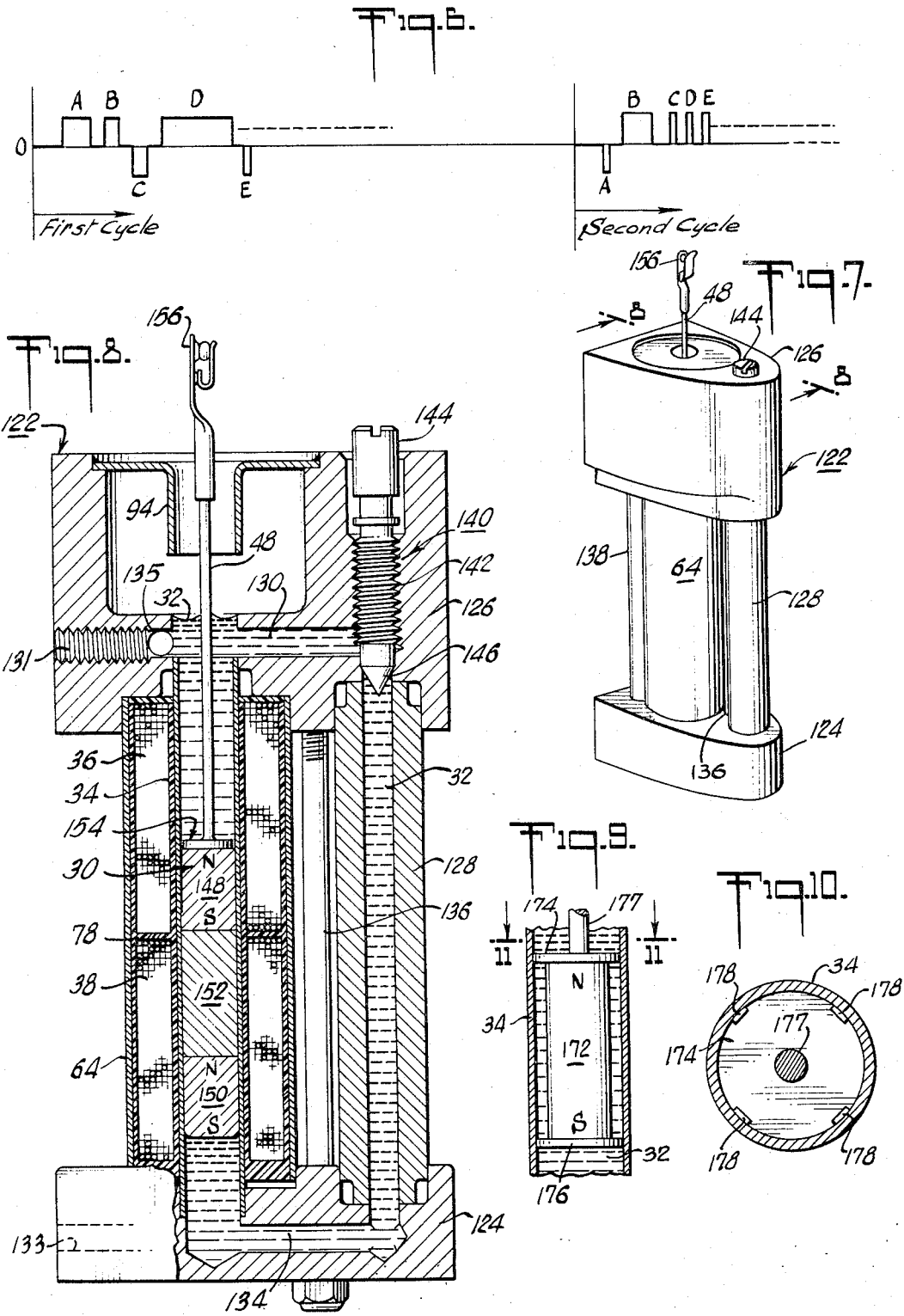

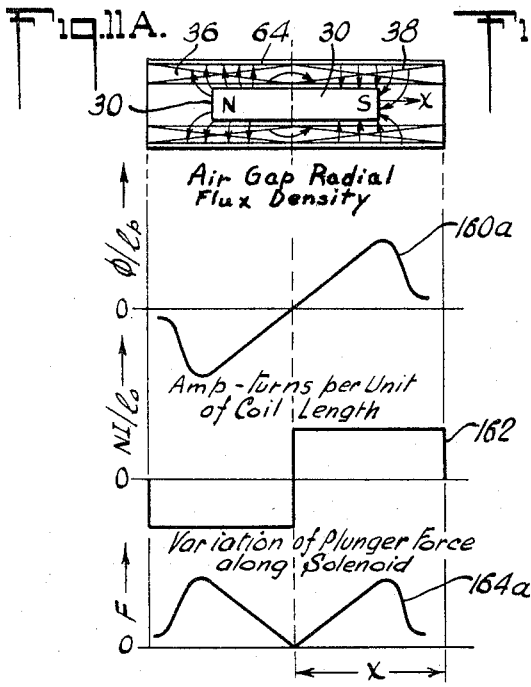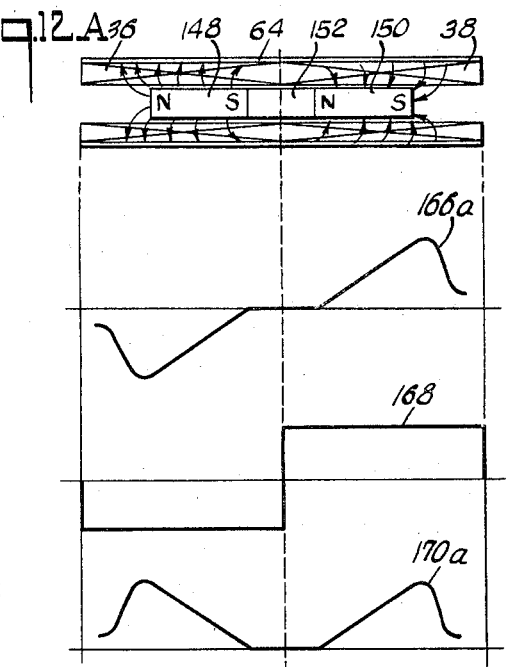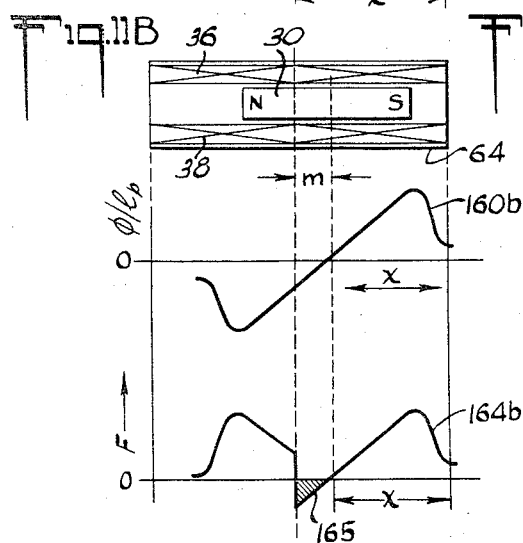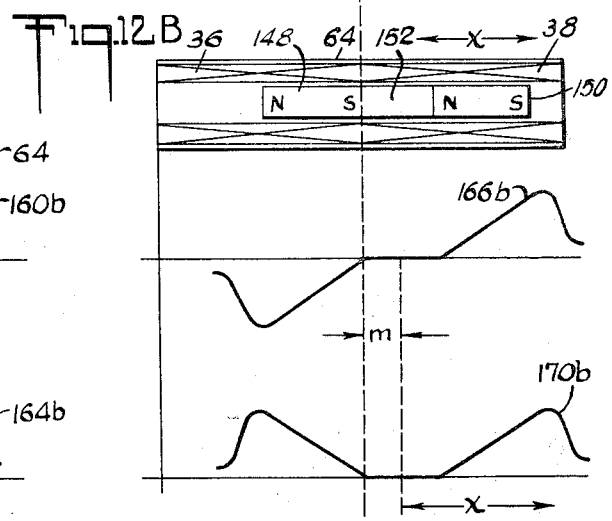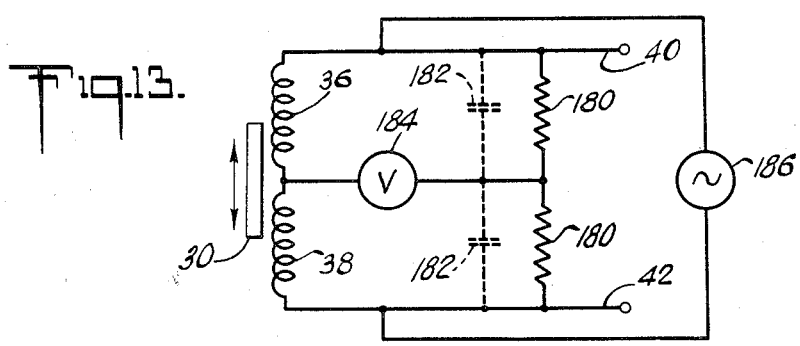

3,441,053
INDUSTRIAL PROCESS CONTROL APPARATUS
Robert J. Robinson, Lexington, Mass., assignor to
The Foxboro Company, Foxboro, Mass.
Filed Oct. 22, 1965, Ser. No. 500,612
Int. Cl. F16k 31/12; F15b 5/00; G05d 16/00
U.S. Cl. 137—595                              10 Claims This invention relates to industrial process control systems. More particularly, this invention relates to such systems in which a time-shared digital data processor is utilized to develop control signals for operating a plurality of process valves or other process regulators.

In recent years, there has been increasing use of high-speed digital data processors or "computers" with industrial process control systems for controlling process conditions such as pressure, temperature and flow rate. To make most effective use of the computing capacity of the data processor, it is desirable that the processor be operated in a time-shared multiplex mode; that is, a mode in which the various process conditions to be controlled are sampled periodically, in a predetermined sequence. As each sample is taken, the computer performs appropriate computations to develop a corresponding output command signal thereby producing a series of command signals each indicating the change to be made in the setting of a corresponding valve or other process regulating means. Such systems have been referred to as "direct digital control" systems, to distinguish from arrangements wherein a digital computer is used simply to adjust the set point of a conventional analog controller.

Advantageously, the data processor in a direct digital control system is arranged to develop for each valve a command signal having a constant magnitude and a time duration proportional to the change to be made in the valve position. Since valves and other process regulators typically are not capable of responding to such time-duration signals, the system also should include means for translating the computer output signal to a suitable control signal adapted to operate the valve. The system additionally should have the capability of maintaining each valve control signal at the computed value during the times when the processor is carrying out computations for the other valves; that is, "drift" of the valve control signal over a period of time should be zero or at least very small.

It is the principal object of the present invention to provide an improved system of the type described above. A more specific object of this invention is to provide such apparatus which is relatively compact, economical to construct, and stable in operation. Other objects, aspects and advantages of the invention will be pointed out in or apparent from the following description considered together with the accompanying drawings in which:

FIGURE 1 is a schematic circuit diagram representing a process control system constructed in accordance with the present invention;

FIGURE 2 is a perspective view, partially in section and partially broken-away, of a component of the system shown in FIGURE 1;

FIGURE 3 is a vertical section of the electromagnetic current-responsive device shown in FIGURE 2;

FIGURE 4 is an enlarged, partially broken-away view of a portion of the structure shown in FIGURE 3;

FIGURE 5 is a graph illustrating the variation of various operational parameters of the device shown in FIGURE 3;

FIGURE 6 is a schematic diagram showing typical wave-forms and time sequences of various command signals produced in the apparatus shown in FIGURE 1;

FIGURE 7 is a perspective view of a modified signal translating unit;

FIGURE 8 is a vertical section taken along line 8—8 of FIGURE 7;

FIGURE 9 is a partially cross-sectional and partially broken-away view of a modified version of the FIGURE 3 structure;

FIGURE 10 is a cross section taken along line 10—10 of FIGURE 9;

FIGURES 11A and 11B are schematic diagrams illustrating certain operational features of the disclosed apparatus;

FIGURES 12A and 12B are schematic diagrams illustrating certain operational features of a modified system; and FIGURE 13 is a schematic circuit diagram of a valve position indicator circuit.

Referring now to FIGURE 1, there is shown in the upper left-hand corner a series of input signal lines 15 each connected to a condition-sensing device (not shown) such as a flow transmitter, temperature sensor or the like, which is adapted to produce a measurement signal indicating the magnitude of the corresponding process condition being measured. Each measurement signal, which may for example be a D-C signal in the range of 10-50 milliamps, is conducted by a corresponding one of the lines 15 to a high-speed digital data processor 16.

This processor 16 includes an input interface means comprising a multiplexer 16a which operates to sample periodically all of the incoming measurement signals in a predetermined sequence. These sample signals are directed in turn to the main computation section of the data processor, and this section functions in conventional ways to carry out the programmed arithmetic operations with respect to each of the measurement signals. For each such computation the data processor produces a corresponding output in the form of a pulse-type command signal having a fixed magnitude and a time-duration proportional to the computed change to be made to the process valve.

These command signals are distributed, through an output interface means comprising a multiplexer 16b to output line 17 each leading to a signal translating unit 18. This unit includes means to be described below, for producing a pneumatic valve control signal which is sent through a line 19 to a conventional process valve 20 which changes the valve position in response to the pneumatic signal it receives.

FIGURE 6 illustrates two successive cycles of typical command signals as delivered over lines 17. Each of the pulses identified by means of one of the capital letters A–E represents a command signal transmitted over one of the multiple output lines 17. These command signals have either a positive or negative polarity, depending upon which direction the valve is to be moved.

Referring now to FIGURES 2 and 3, which show the construction of signal translating unit 18 in detail, the command signal on each line 17 is directed through a pair of wires 40 and 42 to a pair of solenoid coils 36 and 38 of a magnetic force-producing device 26 adapted to develop an output movement of a mechanical member over a distance which is an approximately linear function of the time duration of each command signal. Thus, the device 26 produces a movement of constant velocity during each command signal.

Within the interior of the solenoid coils 36 and 38 is a hollow tube 34 containing a viscous liquid 32. Slidably mounted within this tube is a plunger 30 basically comprising a cylindrical permanent magnet 102 fitted with end pieces 104 and 106, the latter having circumferential sealing means 108. A restricted liquid passageway extends through the interior of the plunger. A full explanation of the features of this liquid passageway will be set forth in detail hereinbelow.

Coils 36 and 38 are connected in series but are reverse-wound to produce flux in opposite directions with respect to the longitudinal axes of the coils. A command signal of one polarity causes the plunger to move in one direction, while a command signal of opposite polarity causes the plunger to move in the opposite direction. For relatively small displacements of the plunger from its central position, the force developed by the coils is approximately proportional to the magnitude of the current flow to the coils. Since this current flow is substantially constant during each command signal, the force developed by the coils is very nearly constant for the duration of the command signal.

The movement of the plunger 30 in response to the solenoid-produced motive force is impeded by the resistance to the flow of the liquid 32 through the restricted passageway of the plunger. At a given fluid temperature, the impedance produced by this "dashpot" effect is such as to cause the plunger to move at a velocity which is a function of the magnitude of the force on the plunger 30, and, hence, it is a function of the magnitude of the current flowing through the solenoid coils.

In the present application, the current magnitude of the process command signals applied to solenoid coils 36 and 38 is constant, so that plunger 30 moves with a substantially constant velocity. Thus, the distance traveled by the plunger will be proportional to the time duration of the corresponding command signal.

Now considering the structure of signal translating unit 18 in greater detail, plunger 30 is secured, at its upper end, to a link 44 which in turn is fastened by a ball joint 46 to an output shaft 48 extending upwardly from the top of the transducer 26. As shown particularly in FIGURE 2, this output shaft 48 is connected through a linkage arrangement to a mechanism for producing an output pressure signal corresponding to the vertical position of shaft 48.

The mechanism for converting the position signal provided by shaft 48 into a pneumatic signal includes a linkage arrangement 54 which is connected to shaft 48 by means of a ball joint 50 and lever arm 52. Linkage 54 is concerned to a pneumatic transmitter 56 which in turn connected to a pneumatic relay 58. Pressurized air is supplied to the relay 58 by means of an air line 61, and a pneumatic output signal emerges from relay 58 through the output line 19 which conducts the output pneumatic signal to the valve 20 (see FIGURE 1). Changes in the vertical position of the plunger 30 cause directly proportional changes in the magnitude of the pressure of the signal supplied to line 19.

The signal translating unit 18 includes a metal housing 55 whose cover is not shown in the drawings. Magnetic force-producing device 26 has a rectangular base 62 with four threaded mounting holes 68 into which screws are fitted to secure the device to the bottom of the case 55. The pneumatic relay 58 also is secured to the bottom of the case 55, with the hoses 19 and 61 and their fittings extending through holes in the case bottom.

A mounting plate 51 is secured to a channel-shaped bracket 53 which is welded at its edges to the cylindrical barrel 64 of the device 26. Linkage 54, pneumatic transmitter 56 and a potentiometer 87 all are mounted on plate 51. Plate 51 is not secured to the case 55. Thus, the components mounted on plate 51 are rigidly and securely mounted with respect to the device 26 with little possibility of misalignment due to external forces applied to the case.

Now considering the linkage 54 in detail, the left end 63 of lever 52 moves up and down between two nuts 65 and 67 on a bolt 69 which is welded to a bracket 71 attached to the mounting plate 51. This arrangement provides an adjustable stop structure for limiting the extent of vertical movement of the plunger shaft 48 and plunger 30.

Lever 52 is rigidly secured at its right end to a shaft 73 which is rotatably mounted at one end in mounting plate 51, and at the other end in boomerang-shaped bracket 75. Bracket 75 is secured to mounting plate 51 by means of a pair of studs 77.

Also attached rigidly to shaft 73 is another lever 79 to the end of which is attached an eccentrically-mounted cylindrical counterweight 81. Counterweight 81 compensates for the weight of the plunger and other components connected to lever 52 and makes the device sensitive to small forces applied to the plunger 30. Counterweight 81 is mounted eccentrically on lever 79 so as to be adjustable to adjust the amount of torque it applies to shaft 73.

Also connected rigidly to shaft 73 is another lever 83 which is connected at its right end to the wiper arm 85 of the potentiometer 87. The potentiometer 87 has a pair of electrical leads 89 which are connected to a meter (not shown) or other means for indicating the magnitude of the signal provided by the position of the plunger shaft 48.

The friction between wiper arm 85 and the body of potentiometer 87 is used to advantage as a brake to hold the linkage 54 and, hence, the plunger 30 and the output signal of convertor 24 at a constant level between successive command signals, thus assuring that the output of the signal translating unit does not "drift."

Also secured to shaft 73, at its rearmost end, is another lever 91 which is pivotally connected to a horizontal lever 93, which, in turn, is pivotally connected to a flapper lever 95 of the pneumatic transmitter 56.

Transmitter 56 is a known device, but its operation will be described here briefly for the sake of completeness. Flapper lever 95 is rigidly secured to a shaft 97 which is pivotally mounted in a bracket 99. Rigidly secured to shaft 97 is a "flapper" 101 which is made of thin, flexible metal. The lower end of flapper 101 covers the outlet opening of an air nozzle 103 which is supplied with pressurized air from relay 58 by means of a hose 105. An air bellows 107 is mounted between a vertical support plate 109 and the central portion of the bracket 99. Bellows 107 is supplied with pressurized air from relay 58 by means of another flexible tube 111. The bracket 99 and the support plate 109 are interconnected by a base plate 113, and the bracket 99 is pivotally mounted on base plate 113 by means of a flexure 115.

When plunger shaft 48 of device 26 moves to a new vertical position, shaft 73 is rotated by means of lever 52, and the position of potentiometer wiper 85 is changed vertically to vary the indicator signal. Lever 91 rotates with shaft 73, and, by means of levers 93 and 95, moves the flapper 101 either away from or closer to the outlet opening of the nozzle 103.

Relay 58 also is well known and is described in U.S. Patent No. 3,105,508. The relay includes a line restrictor (not shown in the drawings, but of the type ordinarily used in flapper-nozzle control devices) interposed between the air supply line 61 and the hose 105, so that the back-pressure of the nozzle 103 will be controlled by positioning of the flapper 101 with respect to the outlet opening of nozzle 103. A pneumatic signal whose magnitude is directly proportional to the nozzle back-pressure is delivered to the outlet hose 19 and to the bellows 107 by way of hose 111. The bellows 107 swings the bracket 99 either toward or away from the opening of nozzle 103 in order to locate the flapper 101 to within a few ten-thousandths of an inch of its position before the change of the position of the shaft 48. The small change in position of the flapper is sufficient to change the output signal delivered to hose 19 by a substantial amount. By these means, the output air hose 19 delivers a pneumatic signal which is directly proportional to the position of shaft 48 and plunger 30.

The structural details of the unit 26 now will be described, again with reference to FIGURE 3. The barrel 64 of the device 26 comprises a metal sleeve welded at its bottom to the base member 62. Base member 62 is provided with an internally threaded nipple 70 at its lower end which is adapted to receive an explosion-proof conduit 72 (see FIGURE 2) for encasing the wires 40 and 42 and leading them to a "safe" room remote from unit 26, thus providing for explosion-proof operation of the device. The wires 40 and 42 pass through one of a pair of holes 72 and 74 in base member 62 and are secured to two electrical terminals 76, only one of which is shown in FIGURE 3. The lower end of tube 34 is cemented by means of epoxy resin onto a projecting portion 80 of the base 62. A washer 82 of insulating material surrounds the tube 34 near its base and the terminals 76 are secured to the washer 82. The spaces 78 surrounding the wires 40 and 42, the terminal 76, and the junction of the tube 34 with the base member 62 are encased or "potted" in epoxy resin. Epoxy resin also fills the spaces 78 between the outer sleeve 64 and the coils 36 and 38 so as to insulate the wires 88 of the coils from surrounding components of the device. A thin insulating washer 84 separates the coils 36 and 38 from one another, and a thin sleeve 86 (see FIGURE 4) of insulating plastic material sold under the trademark "Mylar" insulates the coils 36 and 38 from the tube 34.

This structural arrangement has the advantage that it is made explosion-proof without providing it with a heavy cover. The coils 36 and 38 are encased in epoxy resin, and the joint between the tube 34 and the base member 62 is separated from the atmosphere at the top of the integrator by a column of liquid approximately three inches in length. The electrical input terminals thus are well-protected from the atmosphere and the device need not be encased in a heavy housing to meet the standards set for explosion-proof devices.

A cap structure 66 of the "spill-proof" type is provided for the unit 26. The cap structure 66 includes a spacer member 90 in the form of a cup with an opening in the bottom and bottom sides 92 sloping downwardly toward the opening. This opening forms the top opening for the tube 34. An inner cap member 94 is secured to the top edge of spacer 90 between a gasket 96 and a shield washer 98 by means of a retainer 100 which screws onto external threads at the top of sleeve 64. The downwardly-depending sleeve portion of inner cap member 94 prevents most of the liquid from spilling out of the tube if it is tipped over. When the device is returned to its vertical position, the liquid 32 flows back into tube 34.

Referring now to FIGURE 4 as well as FIGURE 3, the plunger 30 has a number of advantageous features. Plunger 30 comprises a hollow, a thick-walled, tubular-shaped permanent magnet 102 with a pair of brass end-pieces 104 and 106 which are welded onto the magnet 102. Magnet 102 can be made of any known permanent magnetic material, but it is preferred that it be made of "Alnico 5," a special permanent magnet alloy metal, which usually is cast to form the tubular-shaped magnet shown in the drawings.

Much of the flux produced by the coils in the usual solenoid is used to saturate the typical soft-iron plunger. Applicant's plunger 30 is permanently-magnetized and, in effect, already saturated with magnetic flux. Thus, the rate of flux decrease in the plunger as it moves away from its central position is relatively low. As a result, the force variation remains well within tolerable limits throughout a considerable distance away from the central position.

Referring again to FIGURE 4, the lower end-piece 106 of plunger 30 has a circumferential groove into which a plastic piston ring 108 is fitted. Ring 108 ensures that there will be a fluid-tight fit between the plunger 30 and the wall of tube 34. Also, the ring 108 provides resistance to movement of the plunger and, together with the friction of wiper arm 85 of potentiometer 87, provides a braking action which holds the plunger in place between successive command signals, thus protecting against "drift."

End-piece 106 has a centrally-located axial hole of a diameter smaller than the hole in the magnet 102. Into this hole is fitted a capillary tube 110 of a predetermined inside diameter and length. The fluid 32 flows through this tube when the plunger 30 moves through the fluid.

The upper end-piece 104 has a hole 112 in its uppermost end and an enlarged recess 114 communicating with the hole 112. A jewel orifice member 116 is fitted into the recess 114. Orifice member 116 has a tiny, centrally-located hole 118 in a region of reduced thickness, thus forming a sharp-edged orifice.

A second capillary tube 120 of predetermined length and inside diameter passes through and is fitted into the upper end of end-piece 104. The inside diameter of tube 120 preferably is considerably smaller than that of the lower capillary tube 110.

When force is applied to the plunger 30, the fluid 32 in the tube 34 is forced through capillary tube 110 at one end of the plunger, and through the parallel passages provided by the capillary tube 120 and orifice 118. This arrangement provides advantageous temperature compensation for the device so that the velocity of travel of the plunger 30 through the fluid 32 under a constant applied force will remain substantially constant despite wide variations in the temperature of the fluid.

In many dashpots, the fluid flows between the piston and cylinder walls. With this arrangement, the fluid flow is essentially laminar; that is, the fluid flows with low Reynold's numbers and little or no turbulence. When such flow conditions prevail, the velocity of the piston is an inverse function of the viscosity of the fluid through which it moves. Unfortunately, the viscosity of even the best dashpot fluids available varies greatly with temperature. For example, one fluid which has been used is a 5 centistoke dimethylpolysiloxane fluid sold by Dow-Corning under the designation "DC 200." Although this is believed to be one of the best available dashpot fluids, the viscosity of such fluid is approximately 2 centipoises at negative 25° F. and 28 centipoises at positive 175° F., a variation of over ten-to-one. The change in plunger velocity created by such a great viscosity change is not tolerable.

The provision of orifice member 116 with its sharp-edged orifice 118 greatly reduces the variation of plunger velocity with temperature. Essentially, it causes the fluid to flow turbulently instead of laminarily. With turbulent flow, the plunger velocity is essentially independent of the fluid viscosity and, instead, is an inverse function of the square root of the density of the fluid. The density of the fluid varies much less with temperature than does its viscosity.

FIGURE 5 is a graph in which the velocity of plunger 30 is plotted as a function of temperature, with a constant voltage applied to the coils 36 and 38 at all times. The curve X shows the plunger velocity variation when the fluid flow is only through the orifice 116; that is, with capillary tube 110 removed and capillary tube 120 blocked. This curve shows a variation of plunger velocity of only about 18 percent for a 200° F. temperature range, a vast improvement over the 10 to 1 or 1,000 percent variation which would have been experienced with laminar fluid flow past the plunger.

Curve X would have a relatively small positive slope instead of the negative slope shown in FIGURE 5 if there did not exist another source of variation in plunger velocity with temperature. As the temperature of the coils 36 and 38 increases, their resistance also increases. Thus, with command signals of constant voltage as shown in FIGURE 6, the current flow to the coils tends to decrease with increasing temperature, thus decreasing the force applied to the plunger. This tends to reduce the velocity of the plunger. Thus, the coil resistance change causes the negative slope of the curve X.

It should be noted that the velocity of fluid flow through the orifice 116 is proportional to the square root of the pressure applied to the fluid. Since this pressure is proportional to the force applied to the plunger, the flow velocity, and, hence, the plunger velocity is proportional to the square root of the applied force. This is advantageous in that as the applied force changes with plunger position and temperature changes, the plunger velocity changes by a lesser factor proportional to the square root of the force change.

The parallel capillary tube 120 is provided to compensate for the negative velocity characteristic of curve X; that is, to compensate for the effects of the decrease in fluid density and increase in coil resistance with increasing temperature. The flow through the capillary tube 120 is laminar and the velocity of flow through tube 120 is inversely proportional to viscosity of the fluid. The total flow through the piston 30 is the sum of the flow through the orifice 118 and the capillary tube 120. The composite velocity curve obtained when both the capillary tube 120 and the orifice 118 are used is designated Y in FIGURE 5. The fluid density and coil resistance variations give the velocity curve a mild negative slope, and the capillary tube 120 gives curve Y a positive slope. The total velocity variation over a 200° F. temperature span is reduced to around 5 percent by this combination.

Further improvement of the velocity-temperature curve is provided by the addition of capillary tube 110. The velocity of flow through the capillary tube 120 is directly proportional to the pressure on the fluid. The pressure drop along the length of tube 110 reduces the pressure applied to the orifice and capillary tube 120 and thus reduces the flow velocity through those openings. Since the flow through capillary tube 110 is laminar, the amount of pressure drop along tube 110 is directly proportional to viscosity, and tube 110 causes the plunger velocity to tend to decrease with increasing temperatures.

By properly proportioning the relative dimensions of capillary tubes 110 and 120 and orifice 118, the plunger velocity can be made very nearly constant with respect to temperature. In FIGURE 5, curve Z shows the results of using both capillary tubes 110 and 120 and orifice 118. The total velocity variation has been found to be only about one half of 1 percent for a 200° F. temperature variation.

Typical dimensions of the flow passages described above now will be given for a model of the invention which has been successfully tested. The orifice 118 has a diameter of 0.0092 inch, and the central hole in the magnet 102 has a diameter of 0.156 inch. Series capillary tube 110 has an inside diameter of 0.050 inch and a length of 1.11 inches, and the parallel capillary tube 120 has an inside diameter of 0.009 and a length of 0.538 inch.

An alternative electromagnetic unit 122 is shown in FIGURES 7 and 8. Unit 122 is similar in certain respects to unit 26 shown in FIGURES 3 and 4, and corresponding reference numerals are used for corresponding components in the two structures. The main differences between the units 26 and 122 are, first that in the latter the dashpot fluid 32 does not flow through the plunger 30 when the plunger moves in the tube 34, but instead is fed around the plunger through a bypass passage. Also, a valve is provided for adjusting the flow rate through the bypass passage and thereby adjusting the ratio of input current to plunger velocity. Further, there is no orifice or capillary tube arrangement for temperature compensation. In addition, the plunger 30 has a composite structure which will be described hereinbelow.

Referring particularly to FIGURE 8, electromagnetic unit 122 includes a base member 124, a top member 126, a bypass tube 128, and a coil structure. The coil structure includes oppositely-wound coils 36 and 38, and is substantially the same as in the unit 26 shown in FIGURE 3.

Top member 126 has a horizontal hole 130 which communicates with the upper portion of tube 34, and bottom member 124 has a similar horizontal hole 134 which communicates with the bottom of tube 34. The horizontal holes 130 and 134 communicate with vertical holes which are connected together by the bypass tube 128 to form a bypass conduit between the top and bottom of tube 34. The bottom and top members and the coil sleeve 64 are held together by a pair of bolts 136 and 138 (see both FIGURES 7 and 8). Threaded holes 131 and 133 are provided, respectively, in top and bottom members 126 and 124 for mounting the integrator 122 on a support. A metal ball 135 is fitted into the end of each hole 131 and 133 to close the hole.

The fluid bypass passage is provided with a needle valve 140 which comprises a threaded shaft 142 with a slotted head 144 and a pointed tip 146. The threaded shaft 142 engages threads in top member 126 and is shown in its most inward position in which it completely closes the bypass conduit at its tip and thus completely blocks the flow of fluid in the conduit. The slotted head 144 may be turned to withdraw the tip 146 and provide an adjustable opening for varying the rate of fluid flow through the conduit. In this manner, the velocity of the plunger 30 can be adjusted so as to increase and decrease the amount of movement of the plunger 30 for a given magnitude of electrical current input.

The plunger 30 shown in FIGURE 8 is composed of two permanent magnet end-portions 148 and 150 which are secured to a central soft-iron portion 152. The plunger stem 48 is secured to the top of magnet 148 by means of an end-plate 154. A ball-joint coupling 156 is attached to the upper end of shaft 48.

The solenoid structure consisting of the coils 36 and 38 together with the composite plunger 30 provides a much more nearly constant force than the solenoid shown in FIGURE 3. The reason for this can be understood best by referring to FIGURES 11 and 12.

FIGURE 11A shows, schematically, a solenoid structure with a single permanent magnet 30 located centrally with respect to the oppositely-wound coils 36 and 38. FIGURE 11A also includes three curves 160a, 162, and 164a. These curves are qualitative graphs illustrating the variation of magnetic flux and forces along the length of the solenoid.

Curve 160a shows the variation of air gap radial flux density along the permanent magnet plunger; that is, the variation of the radial component of the flux in the air gap between the magnet and the wall of its enclosure. The flux density varies approximately linearly from the north pole to the south pole, and is zero at a point midway between the north and south poles.

Curve 162 shows the ampere-turns per unit of coil length for the coils 36 and 38 with equal currents flowing in each coil. The flux developed by coil 36 is of a polarity opposite to that in coil 38.

Curve 164a shows the variation of the force applied to the plunger. The force at any particular horizontal point is proportional to the product of the coil ampere-turns times the permanent magnet air gap flux at that point. Accordingly, at the center of the magnet, the applied force is zero. The total force applied to the plunger 30 is the summation (that is, the integral with respect to X, the distance along the solenoid) of the forces indicated in curve 164a.

FIGURE 11B shows the same solenoid as in FIGURE 11A, but with the plunger 30 moved to the right of center by a distance m. Curve 160b is identical to curve 160a except that all points have been moved to the right by a distance m. The curve 162 of the coil ampere turns per unit of coil length remains unchanged and is not repeated in FIGURE 11B. Since the plunger air gap flux in the region m is negative and the ampere turns per unit of coil length is positive, the force component 165 produced in that region is negative and opposes the force applied along the remainder of the length of the solenoid. This reduces the total amount of force available by an amount proportional to the square of the distance $m$ moved by the plunger in the coil.

FIGURE 12A shows a solenoid similar to that shown in FIGURE 11A except that the plunger has the structure shown in FIGURE 8; that is, the plunger has a central soft iron portion 152 sandwiched between two permanent magnet members 148 and 150.

The permanent magnet air gap flux variation is shown in curve 166a, which is basically identical to curve 160a except that the flux density is approximately zero near the soft iron piece 152.

The variation of coil ampere turns per unit length is indicated by curve 168, and is substantially identical to that indicated in curve 162.

The force variation curve for the solenoid is shown in curve 170a and is substantially the same as that shown in curve 164a except that no force is produced in the soft iron core portion because the flux in the air gap near that portion is zero.

FIGURE 12B shows the permanent magnet air gap flux density curve 166b, and the force curve 170b after the composite plunger has moved a distance $m$ which is approximately equal to one-half of the length of the soft iron portion 152. The presence of the soft iron portion maintains the permanent magnet air gap flux at a constant zero level along its length and avoids the creation of a negative force component as long as the plunger moves away from a central location by a distance no greater than $m$. Thus, the composite plunger provides a range of plunger movement over which there is little force variation, thus increasing the accuracy of the electromagnetic device 122 in which the composite plunger is used.

The electromagnetic device 122 shown in FIGURES 7 and 8 is advantageous not only in that its composite plunger has a relatively more constant force-variation curve, but also in that it is relatively less sensitive to errors caused by temperature changes than it would be if the bypass fluid conduit were not provided. A considerable portion of the fluid 32 is not closely in contact with the casing around coils 36 and 38 and thus is not subject to heating which might be caused by the electrical heating of these coils.

It should be understood that the composite plunger shown in FIGURE 8 can be made with a hole in it as in FIGURE 3, and can include the temperature compensation arrangements shown in FIGURE 3. It also should be understood that a solid single-magnet plunger may be used in the FIGURE 8 structure, if desired.

FIGURES 9 and 10 illustrate a modified plunger in which the fluid flows between the plunger and the walls of the plunger tube, thus eliminating the need for a by-pass conduit as in FIGURES 7 and 8, or a hollow permanent magnet as in FIGURES 3 and 4. The plunger shown in FIGURES 9 and 10 comprises a cylindrical permanent magnet 172, two non-magnetic guide-plates 174 and 176, with a plunger stem 177 secured to the uppermost plate 174. Each plate 174 and 176 has a diameter such that it fits into tube 34 in fluid-tight sliding contact with the interior wall of tube 34. As is shown in FIGURE 11, each plate 174 or 176 has four symmetrically-positioned notches 178 in its edge so as to provide small fluid flow passages through which the fluid 32 can pass from one end of the plunger to the other.

FIGURES 9 and 10 illustrate a modified plunger in which the fluid flows between the plunger and the walls of the plunger tube, thus eliminating the need for a by-pass conduit as in FIGURES 7 and 8, or a hollow permanent magnet as in FIGURES 3 and 4. The plunger shown in FIGURES 9 and 10 comprises a cylindrical permanent magnet 172, two nonmagnetic guide-plates 174 and 176, with a plunger stem 177 secured to the uppermost plate 174. Each plate 174 and 176 has a diameter such that it fits into tube 34 in fluid-tight sliding contact with the interior wall of tube 34. As is shown in FIGURE 11, each plate 174 or 176 has four symmetrically-positioned notches 178 in its edge so as to provide small fluid flow passages through which the fluid 32 can pass from one end of the plunger to the other.

The guide-plates 174 and 176 align the plunger centrally within the tube 34 so that the fluid flow will be symmetrical around the plunger. If such alignment means were not provided, the plunger would tend to be closer to one side of the tube than the other, especially under the influence of the electromagnetic forces applied to the plunger. Such misalignment would cause the flow-passageway to be asymmetric, and instability and/or errors in the movement of the plunger through the fluid would result.

FIGURE 13 shows a unique arrangement for measuring and indicating the position of the plunger 30 of the electromagnetic dashpot integrator. This arrangement utilizes the coils 36 and 38 and the plunger 30 as a differential inductor. The coils 36 and 38 are connected in a bridge circuit arrangement including two identical resistors 180 or capacitors 182. Each coil 36 and 38 and each impedance element (resistor or capacitor) forms an arm of the bridge circuit. An alternating-current source 186 is connected to opposite junctions between the impedance elements and the coils, and an alternating-current voltmeter 184 is connected between the other junctions of the bridge.

When the plunger 30 is located centrally with respect to the coils, the inductance of each coil, and, hence, the impedance of each side of the bridge circuit is the same, the bridge is balanced, and the voltmeter reading is zero. However, movement of the plunger increases the inductance of one coil while decreasing the inductance of the other coil by a corresponding amount, thus unbalancing the bridge circuit. The reading on voltmeter 184 is a function of the relative position of plunger 30.

The capacitors 182 may be used instead of resistors 184 in order to prevent excessive loading of the command signal circuit. Other appropriate circuitry can be provided for preventing undesired interaction between the command signal circuit and the AC source 186. The frequency of the AC source signals should be high enough to ensure that the AC signals do not move the plunger 30.

The position-indicating signal provided by either the potentiometer 87 or the bridge circuit shown in FIGURE 14 can be used as a feedback signal to condition an analog "back-up" controller serving as a stand-by replacement for the computer 15. When the analog controller is not being used, its output may be maintained equal to the feedback signal developed by the potentiometer or bridge circuit so as to minimize undesirable transients when switching from computer-control to analog-control operation.

I claim:

1. Process control apparatus for use in controlling concurrently the magnitudes of a plurality of different process conditions and comprising, in combination, a high-speed time-shared digital computer, input multiplexing means responsive to said process conditions for developing sequential sampling signals each reflecting the magnitude of a corresponding process condition; output multiplexing means connected to said computer to distribute said command signals to respective valve-operating channels; signal-translating means for each of said channels, said signal translating means including an element mounted for movement to selected positions, force-producing means for each element and responsive to the corresponding command signal to cause movement of the element for the duration of the command signal, means restraining the movement of said element to cause the velocity thereof to be at least approximately constant throughout the duration of the command signal, whereby the change in position of said element is proportional to duration of the command signal; and means controlled by said element for directing to the respective process valve an output signal the magnitude of which corresponds to the position of said element.

2. Apparatus as in claim 1 in which said command signals are delivered at spaced intervals of time, in which said restraining means includes dashpot means having a plunger, said output signal being a function of the position of said plunger, and in which said dashpot means includes means for holding said plunger in position during the time interval between successive ones of said command signals.

3. Process control apparatus comprising, in combination, time-shared means for computing the magnitude of electrical process control command signals corresponding to process parameter sampling signals, and for developing and delivering said command signals to a plurality of process parameter regulation devices, the magnitude of each such command signal being determined by its time duration, each of said parameter regulation devices including dashpot means for producing an output signal which is a function of the time duration of each of said command signals, said dashpot means comprising a dashpot with a plunger and an electromagnetic means for applying a force to said plunger, means for conducting said electrical command signals to said electromagnetic means, and means for regulating a process parameter in accordance with said output signal produced by said dashpot means.

4. Apparatus as in claim 3 in which said plunger includes a permanent magnet.

5. Apparatus as in claim 3 in which said dashpot means includes a housing forming said reservoir, said plunger being slidably mounted in fluid-tight engagement in said housing, a fluid passageway in said housing for passing fluid from one part of said housing to another as it is displaced by movement of said plunger in said housing, an orifice in said fluid passageway, a first capillary passageway forming a part of said fluid passageway, said first capillary passageway being positioned so as to partially by-pass said orifice, a second capillary passageway forming a part of said fluid passageway, said second capillary passageway being connected in series with both said orifice and said first capillary passageway.

6. Process control apparatus comprising, in combination, digital time-shared computing apparatus for developing electrical process control command signals at spaced intervals of time, input interface means for delivering process parameter sampling signals to said computing apparatus from a plurality of process sampling means, each of said command signals comprising a voltage pulse having a constant height with a time duration computed on the basis of a corresponding parameter sampling signal, interface means for delivering said command signals to a plurality of process parameter regulating devices, each of said parameter regulation devices including dashpot means for producing an output signal which is a function of the time duration of each of said command signals, said dashpot means comprising a housing, a viscous liquid in said housing, a piston in said liquid in said housing, said piston being slidably mounted with its sides in fluid-tight contact with the internal walls of said housing, said piston being made of a permanently magnetized material, said piston having a hole communicating between the ends of said piston, an orifice partially closing one end of said hole, a first capillary tube mounted in said end of said piston and making a by-pass connection between said hole and the region in said housing adjacent said one piston end, a second capillary tube mounted in the other end of said piston and communicating between said hole and the region in said housing adjacent said other piston end, two coils wound around said housing adjacent said piston, said coils each being wound in senses opposite to one another, means for conducting said command signals to said coils, friction means for holding said piston during the time interval between adjacent command signals, and means for regulating a process parameter in accordance with said output signal produced by said dashpot means, said regulating means including means for producing an air-pressure signal corresponding to the position of said piston, and means for adjusting said process parameter in accordance with said air-pressure signal.

7. Apparatus as in claim 2 including indicator means responsive to the position of said plunger for producing an electrical indicator signal representative of said motion.

8. Apparatus as in claim 7 in which said indicator means is a potentiometer having a wiper member coupled to move with said plunger, and in which said holding means includes said potentiometer, the frictional engagement of said wiper member in said potentiometer providing a holding force to hold said plunger in place.

9. Apparatus as in claim 7 in which said process control apparatus includes electromagnetic means adjacent said plunger for applying a force to said plunger, means for conducting said electrical command signals to said electromagnetic means, said electromagnetic means including a pair of coils, said plunger being made of magnetic material, and circuit means for energizing said coils with alternating current and providing an electrical indication signal dependent upon the relative inductance of said coils and indicating the position of said plunger relative to said coils.

10. Process control apparatus for use in controlling concurrently the magnitudes of a plurality of different process conditions and comprising, in combination, a high-speed time-shared digital computer, input multiplexing means responsive to said process conditions for developing sequential sampling signals each reflecting the magnitude of a corresponding process condition; output multiplexing means connected to said computer to distribute pulse-type command signals from said computer to respective valve-operating channels; signal-translating means for each of said channels, said signal translating means including an element mounted for movement to selected positions, force-producing means for each element and responsive to the corresponding command signal to cause movement of the element in response to the command signal, means restraining the movement of said element to cause the velocity thereof to be at least approximately proportional to the magnitude of the command signal; and means controlled by said element for directing to the respective process valve an output signal the magnitude of which corresponds to the position of said element.

References Cited

UNITED STATES PATENTS 2,059,151 10/1936 Smith _____ 137—101.19

FOREIGN PATENTS 637,629 3/1962 Canada.

ARNOLD ROSENTHAL, Primary Examiner.

U.S. Cl. X.R.

137—85; 251—30, 54

U.S. DEPARTMENT OF COMMERCE
PATENT OFFICE
Washington, D.C. 20231

UNITED STATES PATENT OFFICE
CERTIFICATE OF CORRECTION

Patent No. 3,441,053                              April 29, 1969

Robert J. Robinson

It is certified that error appears in the above identified patent and that said Letters Patent are hereby corrected as shown below:

Column 3, line 42, "concerned" should read -- connected --.
Column 8, line 37, after "magnet" insert -- plunger --.

Signed and sealed this 1st day of September 1970.

(SEAL)
Attest:

Edward M. Fletcher, Jr.                            WILLIAM E. SCHUYLER, JR.
Attesting Officer                                     Commissioner of Patents